(No Model.)
G. A. BARNES.
CHUCK.
No. 335,009. Patented Jan. 26, 1886.
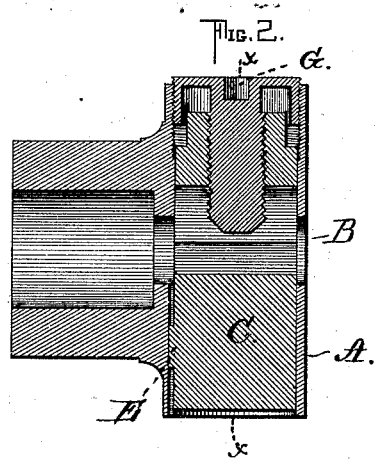
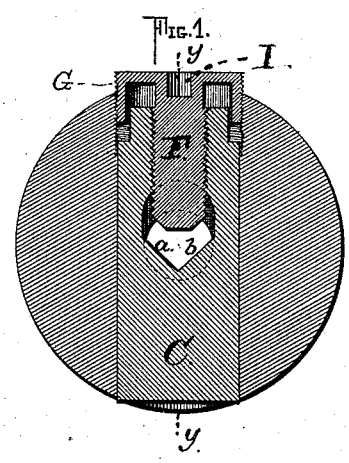
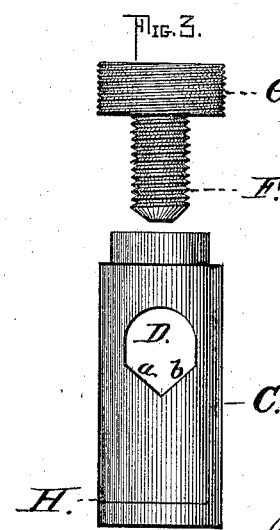
WITNESSES.
David H. Mead
Robert Shriver
INVENTOR.
George A. Barnes.
By Wm C. McIntire ATTY.

UNITED STATES PATENT OFFICE.

GEORGE A. BARNES, OF NEW HAVEN, ASSIGNOR TO FRANK ARMSTRONG, OF BRIDGEPORT, CONNECTICUT.

CHUCK.

SPECIFICATION forming part of Letters Patent No. 335,009, dated January 26, 1886.

Application filed August 7, 1885. Serial No. 173,837. (No model.)

*To all whom it may concern:*

Be it known that I, GEORGE A. BARNES, a citizen of the United States, residing at New Haven, Connecticut, have invented new and useful Improvements in Chucks, of which the following is a specification.

My invention relates to certain new and useful improvements in lathe-chucks.

It has for its object simplicity of mechanical construction and durability and accuracy in use.

I am of course aware that very many improvements in chucks have been suggested and devised, more or less of which have proved successful in operation; but my invention consists, essentially, in the construction of the slide and operating-screw, by means of which I am enabled to use the chuck as a centering or eccentric chuck, and at all times to secure accurate adjustment and positive clamping of the work in the chuck.

In order that those skilled in the art to which my invention relates may fully understand the same, I will proceed to describe the construction and operation of the same, referring by letters to the accompanying drawings, in which—

Figure 1 is a vertical cross section, taken at the line $x\ x$ of Fig. 2, of a chuck embodying my invention. Fig. 2 is a vertical section at right angles to that shown at Fig. 1 and on the line $y\ y$; and Fig. 3 is a face view of the slide and operating-screw removed from the chuck.

At Fig. 1 I have shown the slide and screw in position to chuck the work slightly eccentric, while at Fig. 2 the parts are so arranged as to center the work, as will be hereinafter more fully explained.

Similar letters indicate like parts in the several figures.

A represents the head of the chuck, adapted to be connected in the ordinary manner with the lathe. This head is bored centrally at B to receive the work, and it is also cored or bored transversely to receive a slide, C, which latter is cut away, as seen at D, (see particularly Fig. 3,) forming the converging jaws $a\ b$. The opening in the head of the chuck in which the slide C is seated is provided at one side with a groove to receive a projection, E, on the slide, through which the slide is held in proper relation with the head. The other end of the slide is provided with a female screw-thread to receive the operating-screw F, the head of which is cylindrical and provided with an exterior thread, G, to fit a corresponding thread in the slide-opening in the head of the chuck, as clearly shown at Figs. 1 and 2. The head of this screw is provided with a recess, I, adapted to receive a square operating-key, by means of which the device is operated. A gage-mark, H, is made upon the side of the solid end of the slide, as indicated clearly in Fig. 3, at a predetermined distance from the end, in order that the slide may be so adjusted prior to the introduction of the thread G as to insure the holding of the work by the chuck either centrally or eccentrically, as may be desired. When it is desired that the work shall be held centrally by the chuck, the slide is adjusted so that the gage-line H shall be in line with the periphery of the chuck at the point where the slide enters the same, and when it is desired to have the work held eccentrically the slide is so adjusted as that the gage-line shall be concealed or exposed beyond or outside of the periphery of the chuck. If the gage-line be concealed, the work will be chucked on one side of the center, and if the gage-line be exposed, the work will be chucked on the opposite side of the center, and the degree of eccentricity in either case will be governed by the distance of the gage-line from the periphery of the chuck. At Fig. 1 I have shown the binding parts of the chuck brought toward each other under the condition first named, and at Fig. 2 the relation of the parts shown is such as results from starting the screw under one of the other conditions.

In using my improved chuck, the slide C is introduced into its seat in the head A of the chuck, and then the screw F is introduced from the opposite side and run into the slide. The turning of said screw will cause its end to travel toward and into the opening D of the slide, to bite or clamp the work between the end of said screw and the oblique jaws $a\ b$, and as soon as the fine thread G on the periphery of the screw-head enters the female thread cut in the opening in the head of the chuck it will cause the slide to be drawn toward the end of the approaching screw F. The threads of the shank of screw F and of its head being differential, the slide and screw F move toward each other with equal speed, and consequently, if the slide is adjusted, as before stated, with that object in view, the work will be absolutely centered; but if it is desired to chuck the work eccentrically, the slide is pushed into the head or drawn from the same, so that the gage-mark shall not coincide with the periphery of the chuck-head. It will be observed that the devices employed to produce these results consist simply of the chuck-head, the slide, and the screw. It will be seen that the fine thread G serves the purpose of reciprocating the slide C within its seat, while the thread on the shank F causes the end of the screw to travel toward or from the jaws $a$ $b$, to grasp or release the work.

I have shown the slide with a suitable projection, E, adapted to enter a corresponding groove in the chuck-head, and having for their purpose to prevent any turning of the slide C; but I do not wish to confine myself in this particular, as the projection may be formed on the head and the groove in the slide; or any other suitable means may be employed for accomplishing the like result. Nor is it essential that the slide should be cylindrical, as shown, so long as it is adapted to be operated, as described, by the differential screw F G.

What I claim as new, and desire to secure by Letters Patent, is—

1. The head A and slide C, constructed and adapted to be arranged as described, in combination with the differential operating-screw F G, for centering and clamping the work, substantially as hereinbefore set forth.

2. The combination of the chuck-head A, differential screw F G, and slide C, the latter having a projection, E, adapted to enter a corresponding groove in the head, substantially as and for the purpose set forth.

3. In combination with the head A and differential screw F G, constructed as described, the slide C, provided with the gage-mark H, substantially as and for the purpose set forth.

In testimony whereof I have hereunto set my hand in the presence of two subscribing witnesses.

GEORGE A. BARNES.

Witnesses:
CHARLES L. ULLMAN,
JAMES A. WOOD.